June 23, 1936.  J. P. SMITH  2,044,920
ENGINE SUPPORT
Filed Aug. 5, 1933
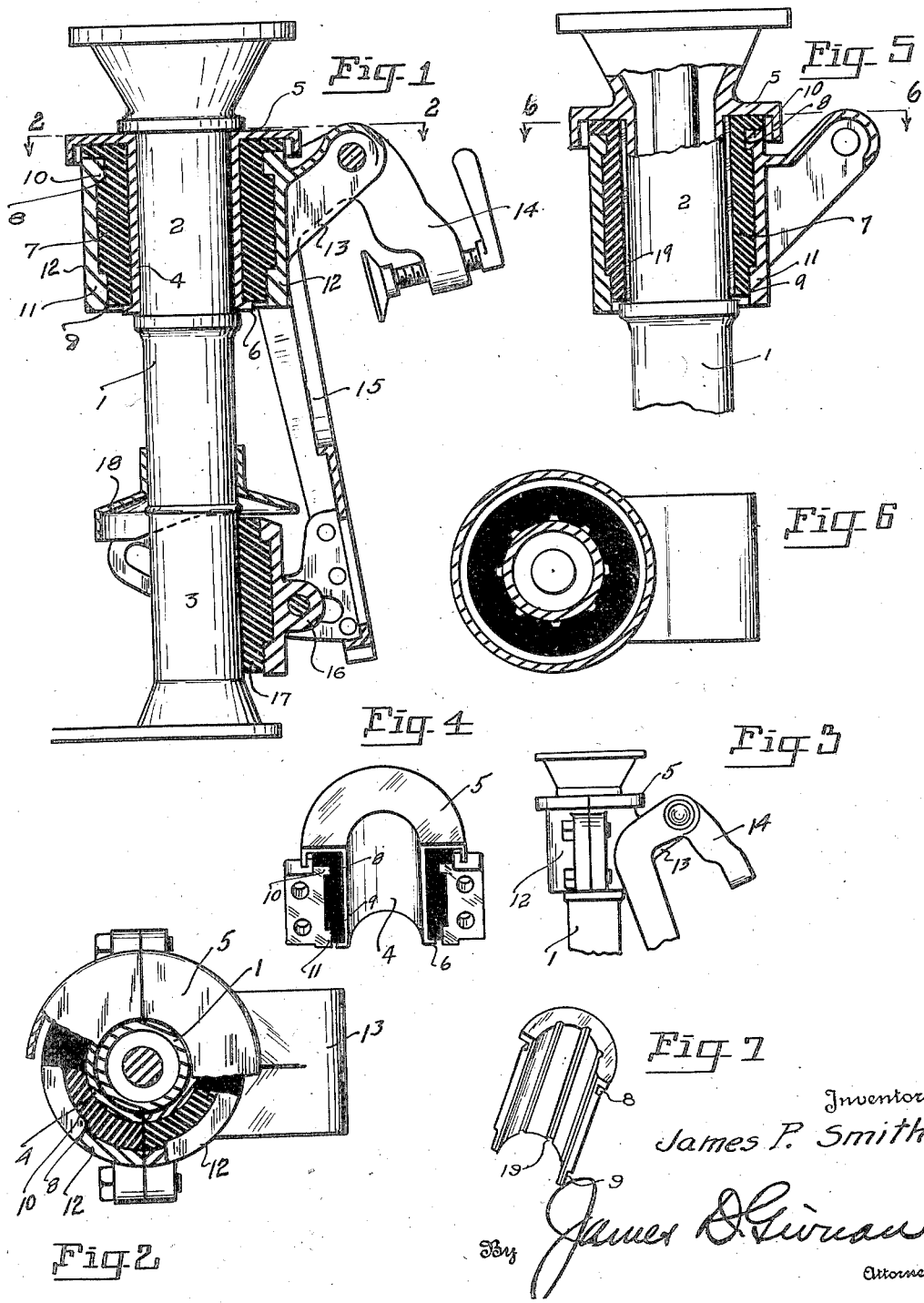
Inventor
James P. Smith
By James D. Girvan
Attorney Patented June 23, 1936

2,044,920

UNITED STATES PATENT OFFICE 2,044,920

ENGINE SUPPORT

James P. Smith, Portland, Oreg.

Application August 5, 1933, Serial No. 683,742

1 Claim. (Cl. 248—4)

This invention is directed to improvements in engine mountings, and more especially to the type of mounting used in connection with outboard engines by means of which the engine is secured to the craft with which it is used.

In the present use of outboard engines, the engines are rigidly secured to the after end of the craft by metal screw-clamps and the like. Such rigid mounting is obviously objectionable for several reasons. First, that the vibration of the engine, rigidly mounted, is transmitted entirely through the craft. Second, the noise of the engine in operation is likewise telegraphed through the craft and greatly amplified by the hollow construction of the craft.

In my present invention, I overcome these and other objections in boat engine mounting by providing insulation between the engine and the craft. Accordingly therefore, the principal object of my invention is to provide a resilient mounting for boat engines by means of which the engine is securely mounted to the craft but at the same time provided with ample insulation to prevent the objectionable noises and vibration from being transmitted to the boat, as aforesaid.

These and other objects will appear as my invention is more fully hereinafter described in the following specification, illustrated in the accompanying drawing and finally pointed out in the appended claim.

In the drawing:

Figure 1 is a side elevation of a drive shaft casing and swivel support for an outboard engine, and showing my invention in operative engagement therewith.

Figure 2 is a top plan view of Figure 1, partly in section.

Figure 3 is a reduced fragmentary view of Figure 1.

Figure 4 is a perspective view of one-half of a swivel bracket showing insulation in connection therewith.

Figure 5 is a modified form of drive shaft casing and swivel bracket.

Figure 6 is a sectional plan view of Figure 5 taken along the line 6—6 of Figure 5.

Figure 7 is a perspective view of one-half of the collar of rubber insulation to be used within the swivel bracket.

Referring now more particularly to the drawing:

Reference numeral 1 indicates the usual drive-shaft casing for an outboard engine, formed with an upper bearing surface 2 and a lower bearing surface 3. A collar 4 is rotatably mounted to the shaft, as shown, and is formed with upper and lower flanges 5 and 6 respectively. A collar 7 of any suitable cushion material, such as rubber or the like, is mounted around the collar 4 and within the flanges 5 and 6. The collar is preferably made in two sections for convenience in mounting it to the casing 1. The collar 7 is formed with external annular grooves 8 and 9 to receive internal flanges 10 and 11 formed on the inner periphery of a swivel bracket 12. The bracket 12 is formed with an outwardly projecting integral arm 13 to which is pivotally mounted any approved type of clamping mechanism as indicated at 14.

Projecting downwardly from the bracket 12 is an arm 15 provided at its lower end with an adjustably mounted thrust bracket 16. The inner surface of the bracket 16 is provided with a cushion bearing 17 of like material used in the collar 7.

The form of invention shown in Figure 5 is almost identical with that shown in Figure 1, except that the inner collar 4 is eliminated and the flange 5 is formed integral with the casing as shown. The flanges in both instances, as well as the flanges 18 over the thrust bearing 17, are provided as a protective against oil, water and other foreign substances, from entering the rubber bearings. The inner periphery of each of the bearings may be provided with longitudinal grooves 19 if desired to facilitate lubrication of the bearings.

While I have shown a particular form of embodiment of my invention, I am aware that many minor changes therein will readily suggest themselves to others skilled in the art without departing from the spirit and scope of the invention. Having thus described the invention, what I claim as new and desire to protect by Letters Patent is:—

A pivotal and resilient supporting means for an outboard engine, said means comprising a vertically disposed circular housing swingably mounted to a bracket, annular shoulders formed on the inner periphery of said housing, a resilient facing securely mounted within said housing and to said shoulders, said facing extending upwardly and outwardly over the upper surface of said housing, a fixed bearing embraced by said resilient facing and provided with flanges at its upper and lower ends, the flanges at the upper end of said bearing extending outwardly over the upper end of said resilient facing, whereby said bearing is cushioned in a fixed relation to said housing, said bearing rotatably supporting the drive shaft casing of said engine and its related parts.

JAMES P. SMITH.